US012709161B2

(12) United States Patent
Ellis et al.

(10) Patent No.: US 12,709,161 B2
(45) Date of Patent: Aug. 18, 2026

(54) METHOD FOR CONTROLLING AN OPERATING CHARACTERISTIC OF A VEHICLE, SUCH AS THE GROUND CLEARANCE

(71) Applicant: SAFRAN LANDING SYSTEMS, Velizy Villacoublay (FR)

(72) Inventors: Andrew Ellis, Moissy-Cramayel (FR); Graeme Klim, Moissy-Cramayel (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 866 days.

(21) Appl. No.: 17/624,390

(22) PCT Filed: Jul. 6, 2020

(86) PCT No.: PCT/EP2020/068984
§ 371 (c)(1),
(2) Date: Jan. 3, 2022

(87) PCT Pub. No.: WO2021/004998
PCT Pub. Date: Jan. 14, 2021

(65) Prior Publication Data

US 2022/0355918 A1 Nov. 10, 2022

(30) Foreign Application Priority Data

Jul. 5, 2019 (FR) ...................................... 1907501

(51) Int. Cl.
*B60L 13/06* (2006.01)

(52) U.S. Cl.
CPC ........... *B60L 13/06* (2013.01); *B60L 2200/26* (2013.01); *B60L 2260/42* (2013.01); *B60L 2260/44* (2013.01)

(58) Field of Classification Search
CPC .. B60L 13/06; B60L 2200/26; B60L 2260/42; B60L 2260/44
See application file for complete search history.

(56) References Cited

U.S. PATENT DOCUMENTS 6,982,537 B2 * 1/2006 Islam ..................... B62D 5/046 318/507
9,346,362 B2 * 5/2016 Tagawa ..................... B60L 3/12
(Continued)

FOREIGN PATENT DOCUMENTS

DE 4334716 A1 * 4/1995 ................ B60L 5/28
FR 2912725 A1 * 8/2008 ............. B64C 25/26
(Continued)

OTHER PUBLICATIONS

International Search Report of PCT/EP2020/068984 dated Sep. 4, 2020 [PCT/ISA/210].

*Primary Examiner* — Jason C Smith
(74) *Attorney, Agent, or Firm* — Sughrue Mion, PLLC

(57) ABSTRACT

The invention relates to a method for controlling an operating characteristic (for example ground clearance or acceleration) of a vehicle (100) resting on a contact surface (200) by means of at least one landing gear (150) comprising means of actuating (160) adapted to vary a behaviour of the landing gear when the latter is in contact with the contact surface, whereby the said method makes the operating characteristic of the vehicle dependent upon a given set-point by generating a command intended for the means of actuating as a function of a difference (ε) between the operating characteristic and the set-point. According to the invention, the control system comprises the use of an estimation ($P_{est}$) of a load (P) seen by the landing gear to generate a modification of the command so as to minimise a variation in the deviation caused by a variation in the load.

12 Claims, 2 Drawing Sheets

(56) References Cited

U.S. PATENT DOCUMENTS

| | | | | |
|---|---|---|---|---|
| 11,845,483 | B2 * | 12/2023 | Ellis | B61C 1/00 |
| 2013/0006454 | A1 * | 1/2013 | Li | B60L 58/12 180/65.265 |
| 2018/0312245 | A1 * | 11/2018 | Klim | B64C 25/60 |
| 2018/0326955 | A1 * | 11/2018 | Georgin | B60T 8/17555 |
| 2021/0031635 | A1 * | 2/2021 | Oide | B60L 15/2072 |
| 2022/0223049 | A1 * | 7/2022 | Lavretsky | G05D 1/0676 |
| 2022/0355918 | A1 * | 11/2022 | Ellis | B60L 13/06 |
| 2022/0402497 | A1 * | 12/2022 | Weston | B60W 40/06 |
| 2023/0108754 | A1 * | 4/2023 | Sun | B61L 25/02 104/23.1 |
| 2023/0331396 | A1 * | 10/2023 | Lee | B64C 39/024 |
| 2024/0034462 | A1 * | 2/2024 | Mazzane | B64C 25/505 |

FOREIGN PATENT DOCUMENTS

| | | | | |
|---|---|---|---|---|
| FR | 3147556 | A1 | * | 10/2024 |
| JP | 2003104200 | A | * | 4/2003 |

* cited by examiner 100
101
102
103
104
150
h
200

100
103
h
150
200
104
150

155
161
158
160
150
153
156
159
162
151
152
h
200
154
P

METHOD FOR CONTROLLING AN OPERATING CHARACTERISTIC OF A VEHICLE, SUCH AS THE GROUND CLEARANCE

CROSS REFERENCE TO RELATED APPLICATIONS

This application is a National Stage of International Application No. PCT/EP2020/068984 filed on Jul. 6, 2020, claiming priority based on French Patent Application No. 19 07501 filed on Jul. 5, 2019, the entire contents of each of which being herein incorporated by reference in their entireties.

BACKGROUND OF THE INVENTION

The invention relates in particular to levitated vehicles adapted to move without sliding or rolling on a contact surface, such as air-cushioned or magnetically levitated vehicles. This type of vehicle levitates at high speeds (typically above 100 km/h) but usually has deployable landing gear that allows it to rest on the ground at lower speeds. In the levitation phase, the ground clearance is entirely managed by acting on the means of levitation. But during the ground-support phase, the ground clearance progressively decreases following the sinking of the dampers of the landing gear and the tyres of its wheels if they are equipped with them, as the action of the means of levitation is released. The ground clearance then depends upon the proportion of the vehicle's weight that is no longer compensated by the means of levitation, but also upon external conditions, such as the ambient temperature, the state of wear of the friction parts in the damper, its conditioning, etc. For some vehicles, particularly of the "hyperloop" type with a train of cars moving in a tunnel under partial vacuum, it is important that this ground clearance is maintained precisely at a given height, in particular to minimise the induced drag and to guarantee the stability of the vehicle, and, for vehicles moving on a rail with reduced clearances, to avoid any contact between the vehicle and the rail.

For this purpose, it is known to equip the landing gear with means of actuating adapted to vary its behaviour, for example its no-load length, and to control these means of actuating in order to keep the ground clearance of the vehicle in contact with the ground constant with respect to the landing gear. For example, FR2912725 discloses the closed-loop control of the shock-absorber cylinder of landing gear for a helicopter in order to make the ground clearance dependent upon a given ground-clearance set-point. However, such a control system, while suitable for grounded aircraft, does not ensure that precise ground clearance is maintained while the vehicle is moving at appreciable speeds, particularly during braking or acceleration phases, due to the relatively slow response of the means of actuating.

PURPOSE OF THE INVENTION

The invention aims to provide a method for controlling an operating characteristic (ground clearance, vertical acceleration, etc.) of a vehicle travelling on a contact surface by means of a landing gear allowing a rapid response to variations in operating conditions affecting the vehicle.

SUMMARY OF THE INVENTION

With a view to achieving this aim, a method is proposed for controlling an operating characteristic (for example, ground clearance or acceleration) of a vehicle resting on a contact surface by means of at least one landing gear comprising means of actuating adapted to vary a behaviour of the landing gear when the latter is in contact with the contact surface, whereby the said method makes the operating characteristic of the vehicle dependent upon a given set-point by generating a command intended for the means of actuating as a function of a difference between the operating characteristic and the set-point. According to the invention, the control system comprises the use of an estimation of a load seen by the landing gear to generate a modification of the command so as to minimise a variation in the deviation caused by a variation in the load.

Thus, the control method of the invention makes use of an estimation of the load carried by the landing gear to detect a variation in the latter and to modify the control of the means of actuating to modify the behaviour of the landing gear in order to minimise a deviation between the estimation of the operating characteristic and the set-point, so as to reduce the impact of such a load variation on the operating characteristic. If the control system is not modified in accordance with the invention, the deviation may temporarily reach significant values that are detrimental to the proper functioning of the vehicle or to the comfort of the passengers. The use of a load estimation, whose variations immediately signal a change in the operating conditions of the landing gear, allows the control to be adapted very quickly in order to avoid significant deviations between the vehicle's operating characteristic and the set-point.

It should be noted that the estimation can be derived from a measurement made by a load cell.

For example, if the load seen by the landing gear suddenly increases as a result of reduced action of the means of levitation or braking or acceleration, the control of the means of actuating of the landing gear will be very rapidly modified so that the means of actuating rapidly modifies the behaviour of the landing gear in order to compensate for a predictable transient decrease in ground clearance due to this sudden increase in load, even before a significant deviation of the ground clearance from the ground clearance set-point is observed, thus reducing the time required for the ground clearance to return to the ground clearance set-point. In this way, the vehicle will not experience any detrimental variation in ground clearance due to the relative slowness of the means of actuating.

According to a first embodiment of the invention, the control is modified by adding a corrective control determined as a function of the estimated load seen by the landing gear.

Preferably then, the corrective control is determined by a predictive algorithm implementing a model of the landing gear's behaviour and anticipating the reaction of the landing gear to a variation in the load seen by the landing gear.

According to a second embodiment of the invention, the control is determined by a controller having characteristics dependent upon the estimated load seen by the landing gear.

Preferably then, the controller is of the PID type characterised by gains that are determined as a function of the estimation of the load seen by the landing gear, for example by means of a parametric function of the estimation of the load, or a table of values.

In a preferred embodiment, the controlled operating characteristic is a ground clearance of the vehicle.

Preferably then, the control is for an electric motor of the landing gear adapted to vary a load/sinkage characteristic of the landing gear.

BRIEF DESCRIPTION OF THE DRAWINGS

The invention will be better understood upon reading the following description of specific embodiments of the method of the invention, while referring to the appended figures, wherein.

DETAILED DESCRIPTION OF THE INVENTION

Figures 1A, 1B, 2:
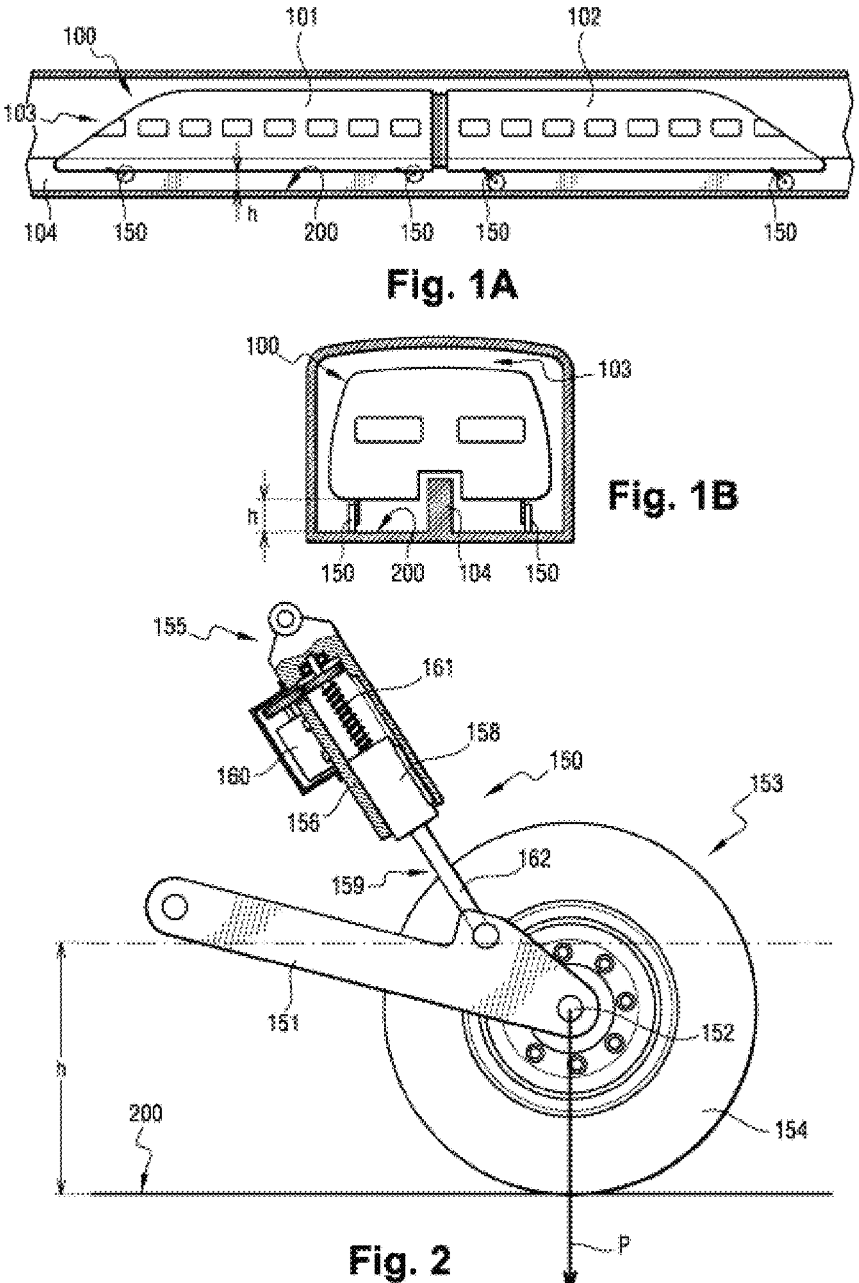
FIG. 1A is a schematic view of a vehicle in the form of a train of magnetically levitated cars travelling in a tunnel under partial vacuum straddling a central rail and bearing on a contact surface by means of landing gear.
FIG. 1B is a front view of the device in FIG. 1A.
FIG. 2 is a schematic view of one of the landing gears fitted to one of the cars of the vehicle in FIG. 1, illustrating the means of actuating adapted to modify the load/sinkage characteristic of the landing gear.

The invention is described here in application to a magnetically levitated vehicle as illustrated in FIGS. 1A and 1B in the form of a train 100 of cars 101 and 102.

The train 100 travels in a tunnel 103 partially evacuated of air in order to minimise aerodynamic drag, straddling a central rail 104 capable of generating a magnetic field suitable for levitating the train 100. The means of magnetic levitation are not detailed here, as they do not constitute the core of the invention.

For low speeds, where the levitating force is not great enough to fully support the train 100, each car rests on a contact surface 200 by means of landing gear 150 together forming a landing gear of the vehicle, each landing gear being deployable between a retracted position (as shown for car 101) in which the landing gear is remote from the contact surface 200, and a deployed position (as shown for car 102) in which the landing gear units 150 are in contact with the contact surface 200 and capable of transmitting, to the ground, a portion of the weight of the car that is not compensated for by the levitating forces (hereinafter the load).

As can be seen in FIG. 2, each landing gear 150 here comprises a swing arm 151 articulated onto the associated car and carrying at its free end, an axle 152, accommodating a wheel or wheels 153 for rotation. Each wheel 153 is equipped with a brake and a tyre 154 for driving on the contact surface 200. A shock-absorber cylinder 155 is coupled between the car and the swing arm 151. The shock-absorber cylinder 155 has a body 156 articulated onto the car, and in which a cylinder 158 of a damper 159 is slidably mounted and can be moved in the body 156 by means of an electric motor 160, here by means of a screw 161 driven in rotation by the electric motor 160.

A rod 162 is slidably mounted in the cylinder 158 of the damper 159. In a manner known per se, the damper 159 can be compressed under load to both suspend the car and dampen its vertical movements. The end of the sliding rod 162 is directly articulated onto the swing arm 151.

For a given position of the damper 159 in the body 156, the sinkage of the landing gear, and therefore the ground clearance h (measured here between the contact surface 200 and the lower part of the car body represented in dotted lines) depends on the load P transmitted to the ground by the wheel, which represents the part of the weight of the car not compensated for by the means of levitation, increased or decreased by the transfers of loads due in particular to the acceleration or braking of the vehicle. If the motor 160 pushes the damper 159 towards the ground, the no-load length of the shock-absorber cylinder 155 will be increased, which will lead to a lower sinkage of the landing gear, and therefore a higher ground clearance for the same load P. The electric motor 160 (as well as the means for transforming the rotary movement of the motor shaft into a displacement of the cylinder 158 of the damper 159, comprising the screw 161) therefore constitute means of actuating capable of modifying the load/sinking characteristic of the landing gear, and therefore the behaviour of the landing gear when the latter is in contact with the contact surface.

Note that the motor 160 can also be used to retract the landing gear to the retracted position, by fully retracting the damper 159 into the body 156.

In the modes of implementation detailed below, the invention aims to implement a control system in order to, when the landing gear is in the deployed position and the car is resting on the contact surface via the landing gear, generate a command u for the electric motor 160 of the landing gear so that the ground clearance h of the car remains as close as possible to a ground clearance set-point hc, with the invention consisting in modifying the command u for the motor as a function of an estimation of the load P seen by the landing gear.

Figure 3:
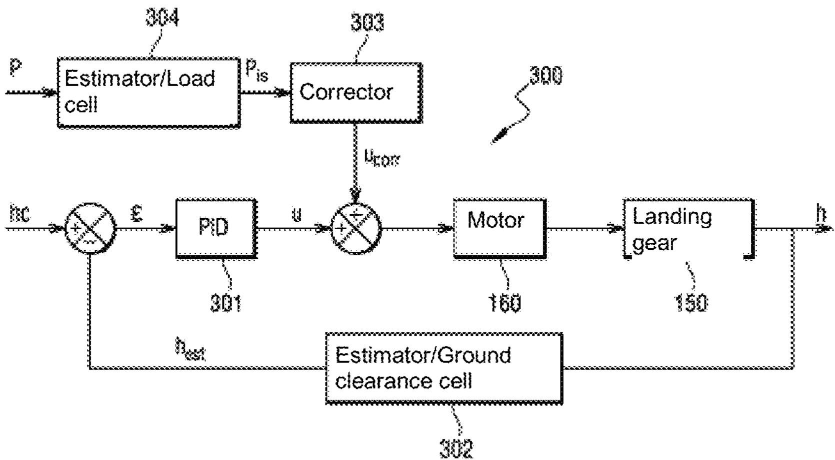
FIG. 3 is a block diagram of a control system for the ground clearance of the vehicle in FIG. 1 according to a first particular mode of implementation of the method of the invention.

According to a first embodiment of the invention, illustrated in FIG. 3, a feedback-loop control system 300 is implemented in which a command u intended for the motor 160 is generated by a PID type controller 301 from a deviation ε between the ground clearance set-point hc and an estimation $h_{est}$ of the ground clearance h, obtained using an estimator 302. The estimator 302 estimates the ground clearance by using data such as damper sinking, or by using a sensor to measure ground clearance directly.

Before the command u is sent to the motor 160 to adjust the position of the damper 159 in the body 156, the command u according to the invention is modified by adding a corrective command $u_{corr}$ which is determined with the help of a corrector 303 (implementing a transfer function) which receives as an input an estimation $P_{est}$ of the load P seen by the landing gear, obtained with the help of an estimator 304. The estimator 304 estimates the ground load by exploiting data such as the internal pressure of the damper 159, or by measuring a force or stress seen by the landing gear 150 using, for example, a force sensor or strain gauges. The corrective command $u_{corr}$ makes it possible to modify the command u by anticipating a predictable increase in the deviation ε due to a sudden variation in load P. Thus, the command u can be changed quickly to compensate for a certain slowness in the reaction of the landing gear to this sudden variation in load P, so as to minimise variations in the deviation ε, and thus minimise variations in ground clearance.

The corrective control is preferably determined by the corrector 303 by means of a predictive algorithm implementing a behavioural model of the landing gear and anticipating the reaction of the landing gear to a change in the load P.

Figure 4:
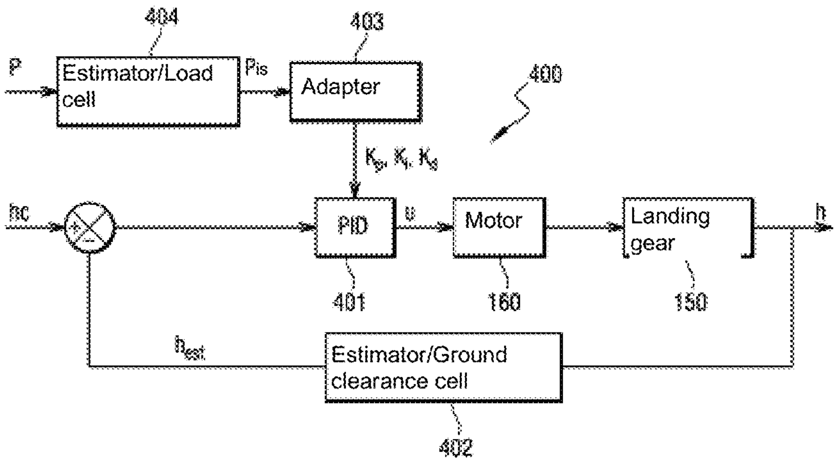
FIG. 4 is a block diagram of a control system for the ground clearance of the vehicle in FIG. 1 according to a first particular mode of implementation of the method of the invention.

According to a second mode of implementation of the method of the invention illustrated in FIG. 4, and in which the elements common to the previous mode of implementation have a reference increased by one hundred, the control system 400 is still of the feedback-loop type and also implements a PID controller 401 to determine a command u from a deviation ε between a ground clearance set-point hc and an estimation of the ground clearance $h_{est}$. Unlike the first implementation mode, the estimation $P_{est}$ of the load P seen by the landing gear is now used not to develop a corrective control, but to modify the gains $k_P$, $k_I$, $k_D$ used by the PID corrector 401 (respectively the gains of the proportional, integral and differential components of the PID). To this end, an adapter 403 is used which, on the basis of the load estimation $P_{est}$, adapts the gains $k_P$, $k_I$, $k_D$ in order to change the command u according to the invention in the direction of minimising variations in the deviation ε, and thus minimising variations in ground clearance.

The gains $k_P$, $k_I$, $k_D$ are preferably calculated in real time from the load estimation $P_{est}$, by using parametric functions, or tables of values, or by implementing sliding mode control.

The invention is not limited to what has just been described but encompasses every alternative solution within the scope of the claims.

In particular, although the invention has been described in application to a magnetically levitated vehicle moving in a tunnel under partial vacuum, the invention is applicable to other types of vehicles, including air-cushioned vehicles, or helicopters or gyroplanes where the rotor(s) can compensate for some of the weight of the aircraft while the aircraft is resting on the ground by its landing gear.

Although the means of actuating for modifying the load/sinkage characteristic of the landing gear takes the form of an electric motor capable of modifying the no-load length of a shock-absorber cylinder, the means of actuating may take other forms, such as means adapted to change the inflation pressure of the damper, or means of fluid transfer adapted to admit or, on the contrary, drain hydraulic fluid into, or from, the damper, or any other means capable of modifying the load/sinkage characteristic of the landing gear, and more generally the behaviour of the landing gear when it is in contact with the ground.

Although the controller illustrated in the two embodiments of the invention is a PID, the invention is not limited to the use of this type of controller, and any other type of controller may be used, for example a bang-bang controller or even a H∞ controller.

Although the methods detailed herein make the ground clearance dependent upon a ground-clearance set-point, the method of the invention can be used to control other vehicle operating characteristics, such as acceleration.

The invention claimed is:

1. A method for controlling an operating characteristic of a vehicle resting on a contact surface by at least one landing gear comprising means of actuating adapted to vary a behavior of the landing gear when the latter is in contact with the contact surface, wherein the method makes the operating characteristic of the vehicle dependent upon a given set-point and an estimation of a load seen by the landing gear by generating a command intended for the means of actuating as a function of a difference between the operating characteristic and the set-point and by modifying the command as a function of a variation of the estimation of the load so as to minimize a variation in the deviation caused by a variation in the load.

2. The method for controlling the landing gear according to claim 1, wherein the command is modified by adding to it a corrective command determined as a function of the estimation of the load seen by the landing gear.

3. The method according to claim 2, wherein the corrective control is determined by a predictive algorithm implementing a model of the behavior of the landing gear and anticipating the reaction of the landing gear to a variation in the load seen by the landing gear.

4. The method according to claim 1, wherein the command is determined by a controller having characteristics dependent upon the estimation of the load seen by the landing gear.

5. The method according to claim 4, wherein the controller is of the PID type characterized by gains which are determined as a function of the estimation of the load seen by the landing gear.

6. The method according to claim 5, wherein the gains are determined by means of a parametric function of the estimation of the load, or a table of values.

7. The method according to claim 1, wherein the controlled operating characteristic is a ground clearance of the vehicle.

8. The method according to claim 1, wherein the command is intended for an electric motor of the landing gear adapted to vary a load/sinkage characteristic of the landing gear capable of modifying the behavior of the landing gear.

9. The method according to claim 8, applied to a vehicle whose landing gear comprises a shock-absorber cylinder whose motor enables a no-load length to be varied.

10. A magnetically levitated vehicle comprising a landing gear associated with means of actuating arranged to implement a control system according to claim 1.

11. The method according to claim 1, wherein the operating characteristic comprises a ground clearance or an acceleration of the vehicle.

12. A method for controlling an operating characteristic of a vehicle resting on a contact surface by at least one landing gear comprising means of actuating adapted to vary a behavior of the landing gear when the latter is in contact with the contact surface, wherein the method makes the operating characteristic of the vehicle dependent upon a given set-point and an estimation of a load seen by the landing gear by generating a command intended for the means of actuating as a function of a difference between the operating characteristic and the set-point and by modifying the command as a function of a rate of variation of the estimation of the load so as to minimize a variation in the deviation caused by a variation in the load.

* * * * *